United States Patent
Park et al.

(10) Patent No.: US 7,411,751 B2
(45) Date of Patent: Aug. 12, 2008

(54) OPTICAL PICKUP ACTUATOR

(75) Inventors: Jung Eung Park, Guri-si (KR); Ho Chul Ryu, Seoul (KR); Sam Nyol Hong, Suwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/257,064

(22) Filed: Oct. 25, 2005

(65) Prior Publication Data

US 2006/0087752 A1    Apr. 27, 2006

(30) Foreign Application Priority Data

Oct. 26, 2004    (KR) ...................... 10-2004-0085922

(51) Int. Cl.
    *G02B 7/02*    (2006.01)
(52) U.S. Cl. ................. 359/824; 369/44.14; 369/44.15; 369/44.16
(58) Field of Classification Search ......... 359/823–824, 359/813–814, 820, 44.14–44.16; 174/16.3; 266/109; 372/36; 439/487; 369/44.14–44.16; 165/186
    See application file for complete search history.

(56) References Cited

U.S. PATENT DOCUMENTS

| | | | | |
|---|---|---|---|---|
| 2,935,711 A | * | 5/1960 | Christensen | 338/18 |
| 3,258,204 A | * | 6/1966 | Smith, Jr. | 237/56 |
| 3,262,494 A | * | 7/1966 | Smith, Jr. | 165/104.31 |
| 5,140,471 A | * | 8/1992 | Kasahara | 359/824 |
| 5,673,152 A | * | 9/1997 | Yokota et al. | 359/813 |
| 5,768,037 A | * | 6/1998 | Marino et al. | 359/824 |
| 5,892,629 A | * | 4/1999 | Nishihara et al. | 359/814 |
| 6,335,548 B1 | * | 1/2002 | Roberts et al. | 257/98 |
| 6,828,170 B2 | * | 12/2004 | Roberts et al. | 438/27 |
| 2002/0092660 A1 | * | 7/2002 | Auer | 174/16.3 |
| 2005/0050569 A1 | * | 3/2005 | Yamanaka et al. | 720/683 |

FOREIGN PATENT DOCUMENTS

JP    11-339291 A    12/1999

OTHER PUBLICATIONS

Chinese Office Action dated Jan. 12, 2007.

* cited by examiner

*Primary Examiner*—Ricky L Mack
*Assistant Examiner*—James R Greece
(74) *Attorney, Agent, or Firm*—Birch, Stewart, Kolasch & Birch, LLP

(57) ABSTRACT

Provided is an optical pickup actuator for writing/reading data in/from an optical storage medium. The optical pickup actuator includes a heat sink member or a heat conductive material for minimizing a bad influence of heat generated from a coil.

22 Claims, 3 Drawing Sheets

OPTICAL PICKUP ACTUATOR

BACKGROUND OF THE INVENTION

1. Field of the Invention

The present invention relates to an optical pickup actuator for writing/reading data on/from an optical medium.

2. Description of the Related Art

An optical pickup actuator functions to constantly maintain a relative distance between an object lens and an optical medium (e.g., a disk) by moving a lens holder holding the object lens. Consequently, the optical pickup actuator enables the object lens to follow a track of the optical medium to write/read data on/from the optical medium.

A related art optical pickup actuator includes an object lens for focusing a laser beam emitted from a laser diode on a recording layer of the optical disk, a lens holder safely holding the object lens, a magnet attached around the lens holder to generate a magnetic force therearound, a yoke protruded from a pickup base to fix the magnet, a coil attached to the lens holder and moved in a focusing direction or a tracking direction of the lens holder by an interaction with the generated magnetic force when a current is applied thereto, and an elastic support having one end fixed to one surface of a fixed frame and the other end fixed to a side of the lens holder so as to drive the lens holder.

When the optical pickup actuator is driven for a long time, heat is generated due to the current applied to the coil. The generated heat badly affects an operation of the optical pickup actuator.

Specifically, the generated heat is transmitted through the lens holder to the object lens. The transmitted heat may cause the object lens to have an increased aberration or cracks due to a corresponding thermal stress.

With the development of multimedia technology, the optical pickup actuator tends to be ceaselessly used for a long time for enjoyment of movies, games, etc.

Accordingly, there is required an optical pickup actuator that can rapidly dissipates the generated heat to prevent the heat from badly affecting it in spite of its long use.

SUMMARY OF THE INVENTION

Accordingly, the present invention is directed to an optical pickup actuator that substantially obviates one or more problems due to limitations and disadvantages of the related art.

An object of the present invention is to provide an optical pickup actuator that can have an improved driving reliability by reducing heat transmitted from a coil to a lens holder.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an optical pickup actuator including: a lens holder holding an object lens; a coil formed in a side of the lens holder; a magnet spaced apart from and faced by the coil; a pickup base supporting the magnet; a fixed frame fixed to the pickup base; an elastic support having one end fixed to the fixed frame and the other end fixed to the lens holder; and a heat sink member formed on the magnet.

In another aspect of the present invention, there is provided an optical pickup actuator including: a lens holder holding an object lens; a coil formed in a side of the lens holder; a magnet spaced apart from and faced by the coil; a pickup base supporting the magnet; a fixed frame fixed to the pickup base; an elastic support having one end fixed to the fixed frame and the other end fixed to the lens holder; and a heat conductive material formed on one surface of the magnet facing the coil.

In a further another aspect of the present invention, there is provided an optical pickup actuator including: a movable unit including an object lens attached thereto and a coil formed therein to follow an optical medium when a current is applied thereto; and a stationary unit supporting the movable unit and including a magnet formed therein to generate a magnetic field, wherein the stationary unit further includes a heat sink member for dissipating heat generated at the coil.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
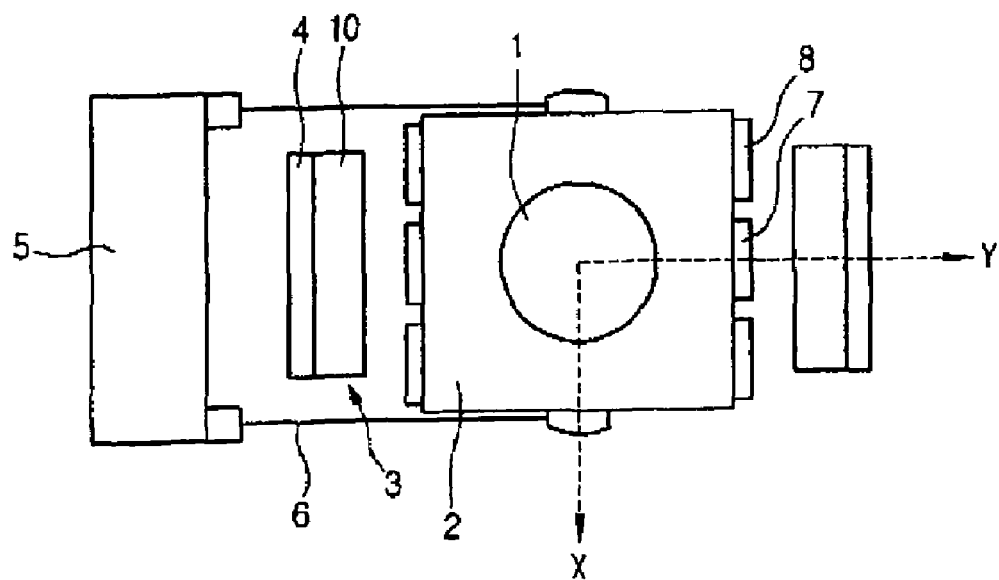
FIGS. 1 through 3 are views illustrating an optical pickup actuator according to a first embodiment of the present invention.
Figure 2:
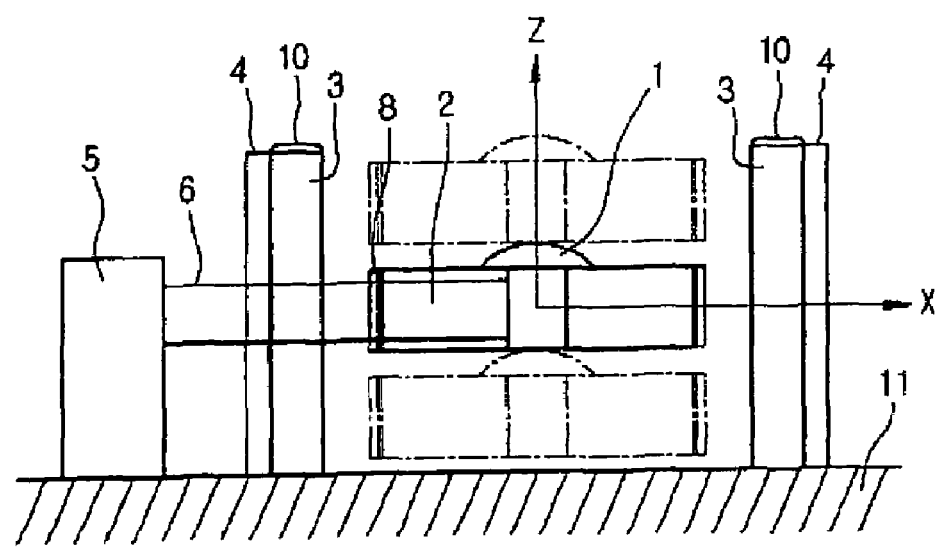
Figure 3:
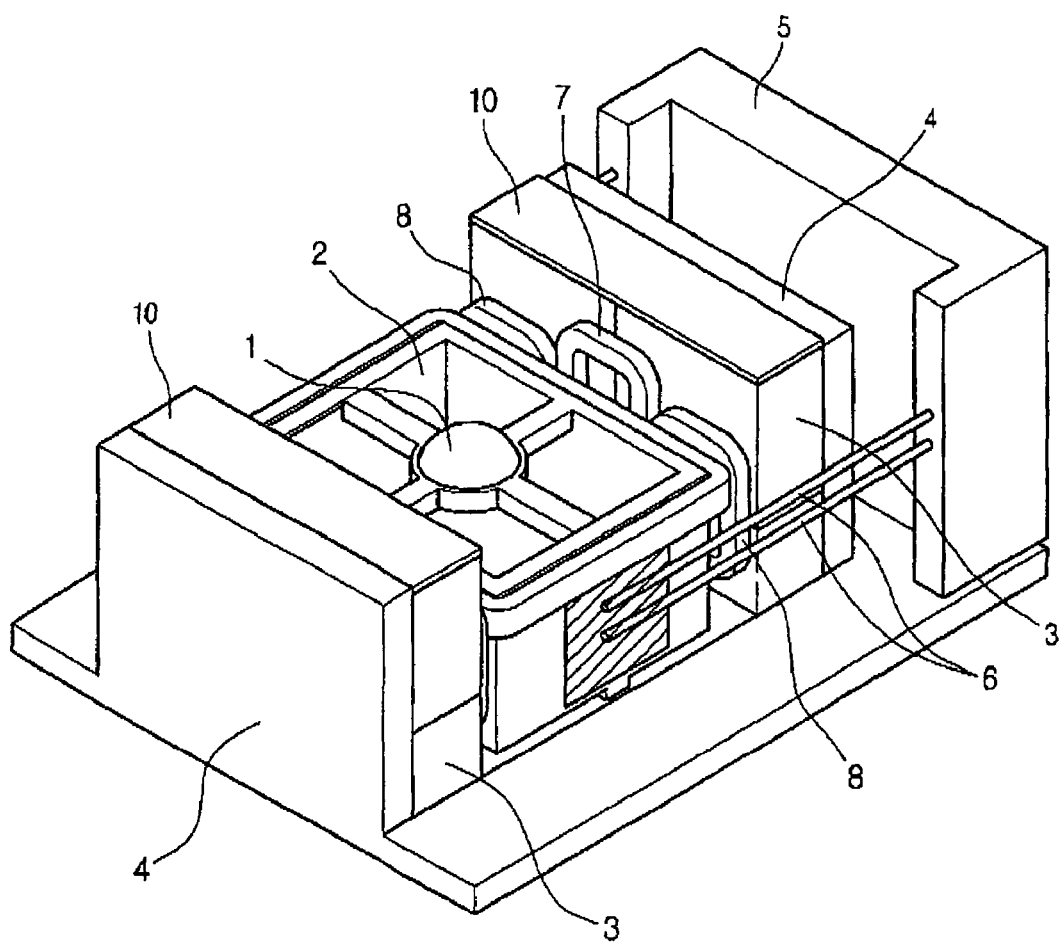

FIGS. 1 through 3 are views illustrating an optical pickup actuator according to a first embodiment of the present invention.

Specifically, FIG. 1 is a top view of the optical pickup actuator, FIG. 2 is a side view of the optical pickup actuator, and FIG. 3 is a perspective view of the optical pickup actuator.

Referring to FIGS. 1 through 3, the optical pickup actuator includes a movable unit mounting an object lens 1 and moving in focusing and tracking directions, and a stationary unit supporting the movable part and generating a magnetic force.

The stationary unit includes a magnet 3 formed around a lens holder 2 holding the object lens 1 to generate a magnetic force therearound, a yoke 4 providing a magnetic path of the magnet 3, a pickup base 11 supporting the magnet 3 and the yoke 4, a fixed frame 5 fixed to the pickup base 11, and a heat sink member 10 formed on a upper surface of the magnet 3.

The movable unit includes the object lens 1, the lens holder 2 holding the object lens 1, a tracking coil 7 fixed to the lens holder 2 to cause the lens holder 2 to drive in the tracking direction when a current is applied thereto, a focusing coil 8 fixed to the lens holder 2 to cause the lens holder 2 to drive in the focusing direction when a current is applied thereto, and an elastic support 6 having one end fixed to one surface of the fixed frame 5 and the other end fixed to a side of the lens holder 2 so as to drive the lens holder 2.

Although not illustrated in the drawings, the movable unit may further include a radial tilting coil for driving the lens holder 2 in a radial tilting direction.

An operation of the optical pickup actuator will now be described in detail with reference to FIGS. 1 through 3.

When a current is applied to the focusing coil 8 and the tracking coil 7 that are located in a region of a magnetic field formed by the magnet 3, the lens holder 2 drives in the focusing and tracking directions.

At this time, heat is generated at the focusing coil 8 and the tracking coil 7. The generated heat is transmitted to the lens holder 2 (which fixes the coils 7 and 8) and the magnet 3 (which is located near the coils 7 and 8).

Since the heat sink member 10 is formed on the upper surface of the magnet 3, the heat transmitted to the magnet 3 is rapidly dissipated to the outside by the heat sink member 10.

When the heat transmitted to the magnet 3 is rapidly dissipated to the outside, the heat transmitted to the lens holder 2 is relatively reduced to minimize the bad influence of the generated heat on the lens holder 2 and the object lens 1.

The heat sink member 10 may be attached to the magnet 3. Alternatively, a heat sink material may be coated on the magnet 3.

The heat sink member 10 may be formed of material selected from the group consisting of aluminum, gold, silver, steel, and lacquer that are shown in Table 1 below.

When the surface thermal emissivity of the heat sink material is high, the heat (energy) transmitted to the magnet 3 can be more rapidly dissipated to the outside.

TABLE 1

| Material | Thermal Emissivity |
|---|---|
| Polished Aluminum | 0.04 |
| Rough Aluminum | 0.06 |
| Anodized Aluminum | 0.80 |
| Gold | 0.04 |
| Silver | 0.02 |
| Rolled-Sheet Steel | 0.55 |
| Mild Steel | 0.20-0.32 |
| Black or White Lacquer | 0.80-0.95 |

As shown in Table 1, examples of aluminum include polished aluminum, rough aluminum, and anodized aluminum. Examples of steel include rolled-sheet steel and mild steel. Examples of lacquer include black lacquer and white lacquer.

The polished aluminum has a low thermal emissivity of 0.04, while the anodized aluminum has a high thermal emissivity of 0.0.

When the heat sink member 10 is formed of material having a higher thermal emissivity than the magnet 3, the heat transmitted to the magnet 3 can be rapidly dissipated to the outside.

Accordingly, it is preferable that the heat sink member 10 is formed of anodized aluminum or black or white lacquer.

Alternatively, the heat sink member 10 may be formed of material having a higher thermal conductivity than the magnet 3. In this case, the heat transmitted to the magnet 3 can also be rapidly dissipated to the outside.

In this manner, the heat sink member 10 can rapidly dissipate the heat transmitted to the magnet 3 facing the focusing coil 8 and the tracking coil 7.

Accordingly, it is possible to minimize the heat transmitted from the focusing coil 8 and the tracking coil 7 to the lens holder 2.

Figure 4:
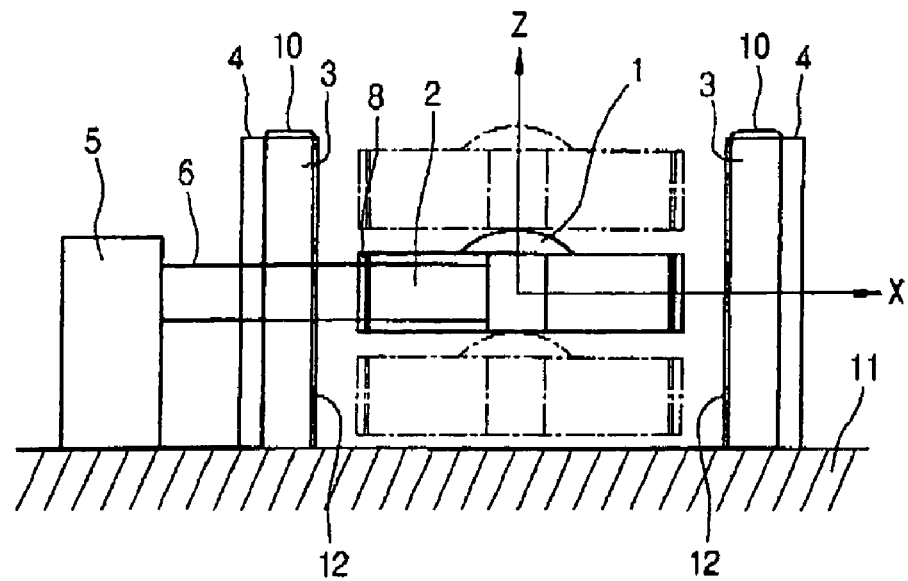
FIG. 4 is a view illustrating an optical pickup actuator according to a second embodiment of the present invention.

FIG. 4 is a view illustrating an optical pickup actuator according to a second embodiment of the present invention.

In describing the second embodiment, a description about the content overlapping with the first embodiment will be omitted for conciseness.

Referring to FIG. 4, in an optical pickup actuator according to the second embodiment, a heat sink member 10 is formed on an upper surface of a magnet 3, and a heat conductive material 12 is formed on a surface of the magnet 3 facing a focusing coil 8 and a tracking coil 7.

The heat sink member 10 may be formed of material having a higher thermal emissivity than the magnet 3, or may be formed of material having a higher thermal conductivity than the magnet 3.

Also, the heat conductive material 12 may be formed of material having a higher thermal conductivity than the magnet 3.

The heat conductive material 12 faces the tracking coil 7 and the focusing coil 8, rapidly absorbs heat generated at the coils 7 and 8, and transmits the absorbed heat to the magnet 3 and the heat sink member 10.

Accordingly, it is possible to minimize the heat transmitted from the focusing coil 8 and the tracking coil 7 to the lens holder 2.

Figure 5:
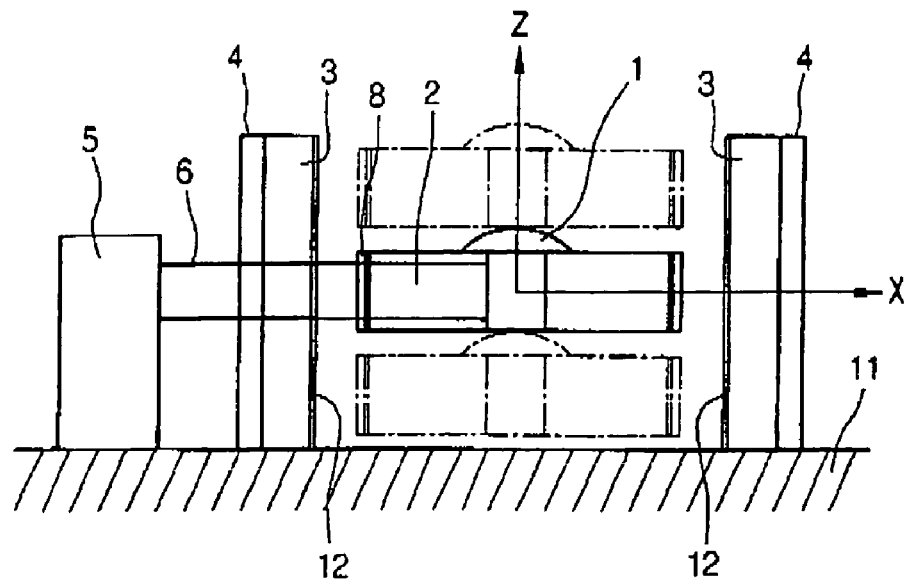
FIG. 5 is a view illustrating an optical pickup actuator according to a third embodiment of the present invention.

FIG. 5 is a view illustrating an optical pickup actuator according to a third embodiment of the present invention.

In describing the second embodiment, a description about the content overlapping with the first embodiment will be omitted for conciseness.

Referring to FIG. 5, in an optical pickup actuator according to the third embodiment, a heat conductive material 12 is formed on a surface of a magnet 3 facing a focusing coil 8 and a tracking coil 7.

The heat conductive material 12 may be formed of material having a higher thermal conductivity than the magnet 3.

The heat conductive material 12 faces the tracking coil 7 and the focusing coil 8, rapidly absorbs heat generated at the coils 7 and 8, and transmits the absorbed heat to the magnet 3.

Accordingly, it is possible to minimize the heat transmitted from the focusing coil 8 and the tracking coil 7 to the lens holder 2.

As described above, the optical pickup actuator has the coils and the magnet for driving the lens holder and minimizes the heat transmitted from the coils to the lens holder when a current is applied to the coils. Accordingly, it is possible to enhance the driving characteristic of the optical pickup actuator.

Specifically, it is possible to minimize the bad influence of the heat generated when the optical pickup actuator is ceaselessly used for a long time for enjoyment of movies, games, etc.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical pickup actuator comprising:
a lens holder holding an object lens;
a coil formed in a side of the lens holder;

a magnet spaced apart from and faced by the coil such that the coil is disposed between the lens holder and the magnet;
a pickup base supporting the magnet;
a fixed frame fixed to the pickup base;
an elastic support having one end fixed to the fixed frame and the other end fixed to the lens holder; and
a heat sink member formed on the magnet and configured to dissipate heat generated by the coil and transferred to the magnet,
wherein the coil is formed directly adjacent to the lens holder such that the heat generated by the coil is transferred to the lens holder, and then the heat transferred to the lens holder is transferred to the magnet and is dissipated by the heat sink member formed on the magnet.

2. The optical pickup actuator according to claim 1, wherein the heat sink member is coated on an upper surface of the magnet.

3. The optical pickup actuator according to claim 1, wherein the heat sink member has a higher thermal emissivity than the magnet.

4. The optical pickup actuator according to claim 1, wherein the heat sink member has a higher thermal conductivity than the magnet.

5. The optical pickup actuator according to claim 1, wherein the heat sink member is formed of anodized aluminum.

6. The optical pickup actuator according to claim 1, wherein the heat sink member is formed of black or white lacquer.

7. An optical pickup actuator comprising:
a lens holder holding an object lens;
a coil formed in a side of the lens holder;
a magnet spaced apart from and faced by the coil such that the coil is disposed between the lens holder and the magnet;
a pickup base supporting the magnet;
a fixed frame fixed to the pickup base;
an elastic support having one end fixed to the fixed frame and the other end fixed to the lens holder; and
a heat conductive material formed on one surface of the magnet facing the coil and configured to dissipate heat generated by the coil and transferred to the magnet,
wherein the coil is formed directly adjacent to the lens holder such that the heat generated by the coil is transferred to the lens holder, and then the heat transferred to the lens holder is transferred to the magnet and is dissipated by the heat sink member formed on the magnet.

8. The optical pickup actuator according to claim 7, further comprising a heat sink member formed on the magnet.

9. The optical pickup actuator according to claim 8, wherein the heat sink member is coated on an upper surface of the magnet.

10. The optical pickup actuator according to claim 8, wherein the heat sink member has a higher thermal emissivity than the magnet.

11. The optical pickup actuator according to claim 8, wherein the heat sink member has a higher thermal conductivity than the magnet.

12. The optical pickup actuator according to claim 8, wherein the heat sink member is formed of anodized aluminum.

13. The optical pickup actuator according to claim 8, wherein the heat sink member is formed of black or white lacquer.

14. The optical pickup actuator according to claim 7, wherein the heat conductive material is coated on the magnet.

15. The optical pickup actuator according to claim 7, wherein the heat conductive material has a higher thermal conductivity than the magnet.

16. An optical pickup actuator comprising:
a movable unit including a lens holder for holding an object lens attached thereto and a coil formed therein to follow an optical medium when a current is applied thereto; and
a stationary unit supporting the movable unit and including a magnet formed therein to generate a magnetic field,
wherein the coil is disposed between the lens holder and the magnet,
wherein the stationary unit further includes a heat sink member formed on an upper surface of the magnet for dissipating heat generated by the coil and transferred to the magnet, and
wherein the coil is formed directly adjacent to the lens holder such that the heat generated by the coil is transferred to the lens holder, and then the heat transferred to the lens holder is transferred to the magnet and is dissipated by the heat sink member formed on the magnet.

17. The optical pickup actuator according to claim 16, wherein the heat sink member has a higher thermal emissivity than the magnet.

18. The optical pickup actuator according to claim 16, wherein the stationary unit further includes a heat conductive material for absorbing and dissipating the heat generated at the coil.

19. The optical pickup actuator according to claim 18, wherein the heat conductive material is formed on one surface of the magnet facing the coil.

20. The optical pickup actuator according to claim 1, wherein the coil includes a tracking coil and a focusing coil in which the tracking coil and the focusing coil are disposed in a same plane in the side of the lens holder.

21. The optical pickup actuator according to claim 7, wherein the coil includes a tracking coil and a focusing coil in which the tracking coil and the focusing coil are disposed in a same plane in the side of the lens holder.

22. The optical pickup actuator according to claim 16, wherein the coil includes a tracking coil and a focusing coil in which the tracking coil and the focusing coil are disposed in a same plane in the side of the lens holder.

* * * * *